(12) United States Patent
Shoukrun (10) Patent No.: US 10,989,670 B1
(45) Date of Patent: Apr. 27, 2021

(54) DETECTION OF PITS USING AN AUTOMATIC OPTICAL INSPECTION SYSTEM

(71) Applicant: CAMTEK LTD., Migdal Haemeq (IL)

(72) Inventor: Aki Shoukrun, Oranit (IL)

(73) Assignee: CAMTEK LTD., Migdal Haemeq (IL)

( * ) Notice: Subject to any disclaimer, the term of this patent is extended or adjusted under 35 U.S.C. 154(b) by 0 days.

(21) Appl. No.: 16/221,630

(22) Filed: Dec. 17, 2018

Related U.S. Application Data (60) Provisional application No. 62/607,369, filed on Dec. 19, 2017.

(51) Int. Cl.
*G01N 21/95* (2006.01)
*G01N 21/956* (2006.01)

(52) U.S. Cl.
CPC ....... *G01N 21/9505* (2013.01); *G01N 21/956* (2013.01)

(58) Field of Classification Search
CPC . G01N 1/9501; G01N 21/9505; G01N 21/956
USPC .......................................... 356/237.1; 355/30
See application file for complete search history.

(56) References Cited

U.S. PATENT DOCUMENTS

| | | | |
|---|---|---|---|
| 5,995,217 A * | 11/1999 | Watanabe | G01N 21/49 356/237.1 |
| 2007/0286473 A1* | 12/2007 | Leslie | G01N 21/9501 382/146 |
| 2008/0243412 A1* | 10/2008 | Horie | G01N 21/9501 702/82 |
| 2010/0053603 A1* | 3/2010 | Sakaguchi | G01B 11/30 356/237.4 |
| 2019/0107495 A1* | 4/2019 | Shafiei | G01N 21/8806 |

* cited by examiner

*Primary Examiner* — Hung Nguyen
(74) *Attorney, Agent, or Firm* — Reches Patent (57) ABSTRACT

A method for detecting defects in a thinned die, the method may include inspecting the thinned die with a two-dimensional inspection module, to find suspected defects that appear as non-reflecting regions that fulfill a size condition; measuring, using a depth measurement module, a depth of the suspected defects; and defining a suspected defects as a defects when the depth parameter exceeds a depth threshold.

22 Claims, 6 Drawing Sheets

DETECTION OF PITS USING AN AUTOMATIC OPTICAL INSPECTION SYSTEM

CROSS REFERENCE

This application claims priority from U.S. provisional patent Ser. No. 62/607,369, filing date Dec. 19, 2017.

BACKGROUND

As mobile phones and other handheld devices continue to be a key driver of semiconductor innovation, chips often go into systems that demand a small footprint and minimum height. Since wiring dimensions of a chip are much smaller than that on a board, a chip cannot be mounted directly on a board.

Instead, a substrate is typically used to spread and map the wiring between the chip and the board. With multiple chips, a larger substrate or even multiple substrates are needed, as in the current 2.5-D integrated packaging, or three dimensional integrated circuit (3-D-IC) packaging. On the other hand, new chip packages such as InFO (meaning, Integrated Fan-Out) wafer-level packaging allows chip(s) (in the form of a die) to be mounted directly on a circuit board using wafer molding and metal. This eliminates the substrate and therefore reduces the height of the mounted chip.

In addition, multiple dies can be packaged together in one InFO package without the use of a traditional substrate between the dies and the printed circuit board (PCB) that the package is mounted on. This reduces not only the height, the footprint as well—allowing mobile devices to be thinner, lighter and more cost-effective.

According to some die producers, such new packaging technology offers up to twenty percent reduction in package thickness, a twenty percent speed gain and ten percent better power dissipation. Compared to other solutions, the much smaller footprint and cost structure of the InFO wafer-level packaging technology makes it an attractive option for mobile, consumer, automotive and internet of things (IoT) applications.

InFO technology is based on a wafer molding and fine pitch (5/5 um) metal process without substrate and this enables reduces thickness, optimized performance and lower costs for mobile computing programs.

For any package technology, integrity, reliability and cost are three major vectors that need to be optimized. Optimizing and ensuring the integrity and reliability of a chip (at a die-level) in the context of its respective package, board and system is very complex, even for the brightest engineers using most advanced AOI systems, especially when the chip uses advanced process nodes. The same analyses become even more complex when multiple dies are used as in a 2.5-D or 3-D-IC package such as InFO. The same is true when ensuring chip-aware system-level integrity and reliability.

The newer the process technology, the higher the opportunity for failure, and even greater is the cost of design mistakes. Failure of the chip may cost tens of millions of dollars. New rules, parameters and requirements for the seven nanometers process must be applied. Therefore, effective inspection of the new packages is required.

SUMMARY

There may be provided a method for detecting defects in a thinned die, the method may include (a) inspecting the thinned die with a two-dimensional inspection module, to find suspected defects that appear as non-reflecting regions that fulfill a size condition; (b) measuring, using a depth measurement module, a depth of the suspected defects; and (c) defining a suspected defects as a defects when the depth parameter exceeds a depth threshold.

There may be provided a system comprising a two-dimensional inspection module and a depth measurement module. The depth measurement module may belong to a three-dimensional inspection module. The two-dimensional inspection module may be configured to inspect a thinned die to find suspected defects that appear as non-reflecting regions that fulfill a size condition. The depth measurement module may be configured to measure a depth of the suspected defects. A processor of the system that may be configured to define suspected defects as a defects when the depth parameter exceeds a depth threshold.

There may be provided a non-transitory computer readable medium that may store instructions that once executed by a system causes the system to: inspect the thinned die with a two-dimensional inspection module of the system, to find suspected defects that appear as non-reflecting regions that fulfill a size condition; measuring, using a depth measurement module of the system, a depth of the suspected defects; and defining a suspected defects as a defects when the depth parameter exceeds a depth threshold.

BRIEF DESCRIPTION OF THE INVENTION

The present invention will be understood and appreciated more fully from the following detailed description taken in conjunction with the drawings in which.

DETAILED DESCRIPTION OF THE INVENTION

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

One of the major problems of InFO packages is the pits defects that may be found in the molding compound and it is important to measure those pits depth and to correctly identify pits in the molding compound. This sort of measurement and recognition may be done by the suggested AOI system and method.

Because the die height is important (package thickness), the die is grinded after molding, to make it thinner and that is the main reason for the pits created as described below.

Figure 1:
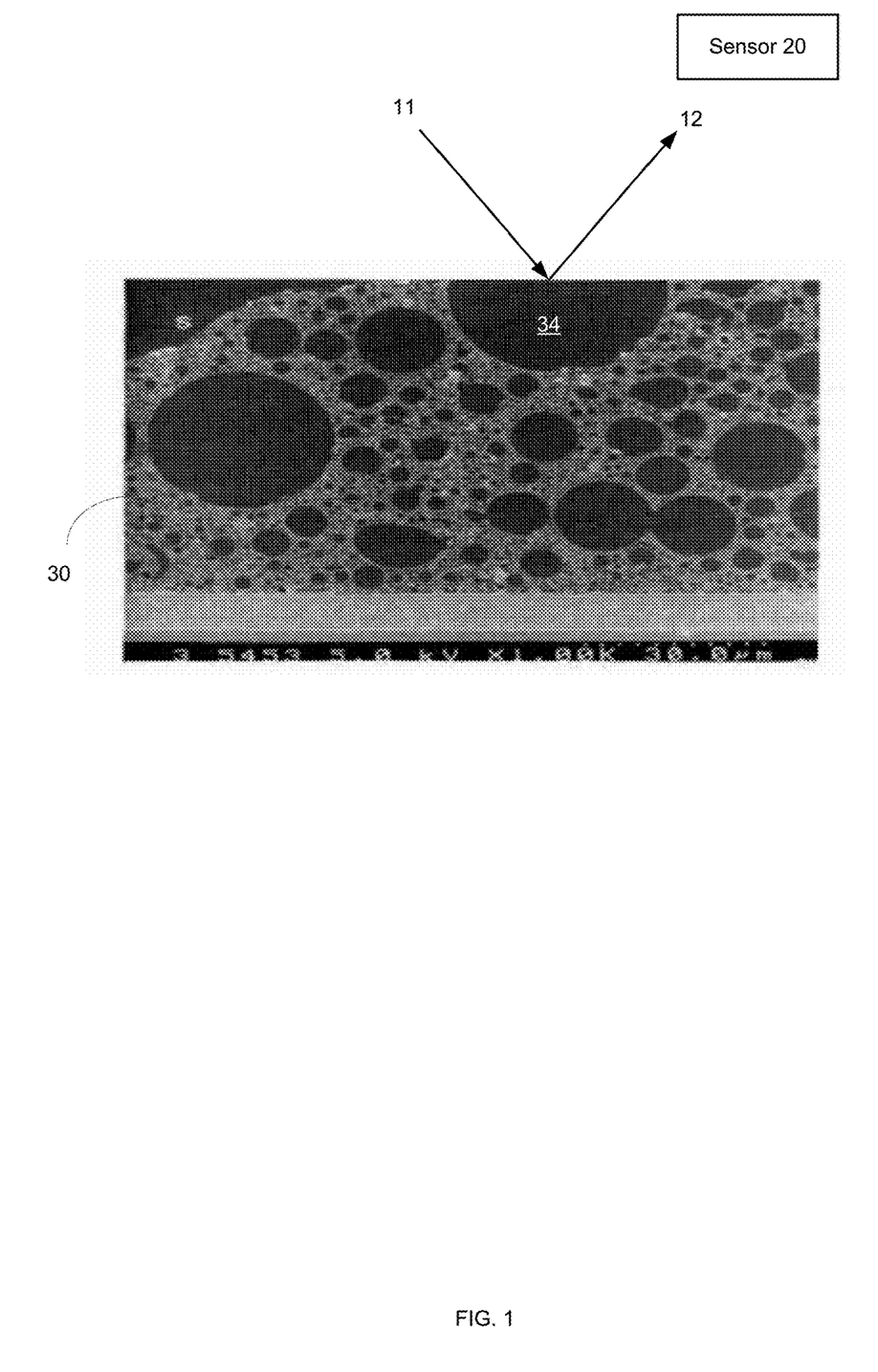
FIG. 1 is an example of a cross section of a part of a chip and illumination and reflected radiation beams.

FIG. 1 is an example of a cross section of a part 30 of a chip, illumination beam 11, and a reflected radiation beam 12 that is reflected from a solid (filled) molding compound filler 34—towards sensor 20.

Molding compound fillers are generally solid and few may include hollows.

These hollow fillers only have an external shell, like eggshell. Under a two-dimensional camera these hollow fillers are viewed as dark circular spots by giving diffusive light, with a little reflective light. This kind of defect are generally identifies as a molding pits defects.

Figure 2:
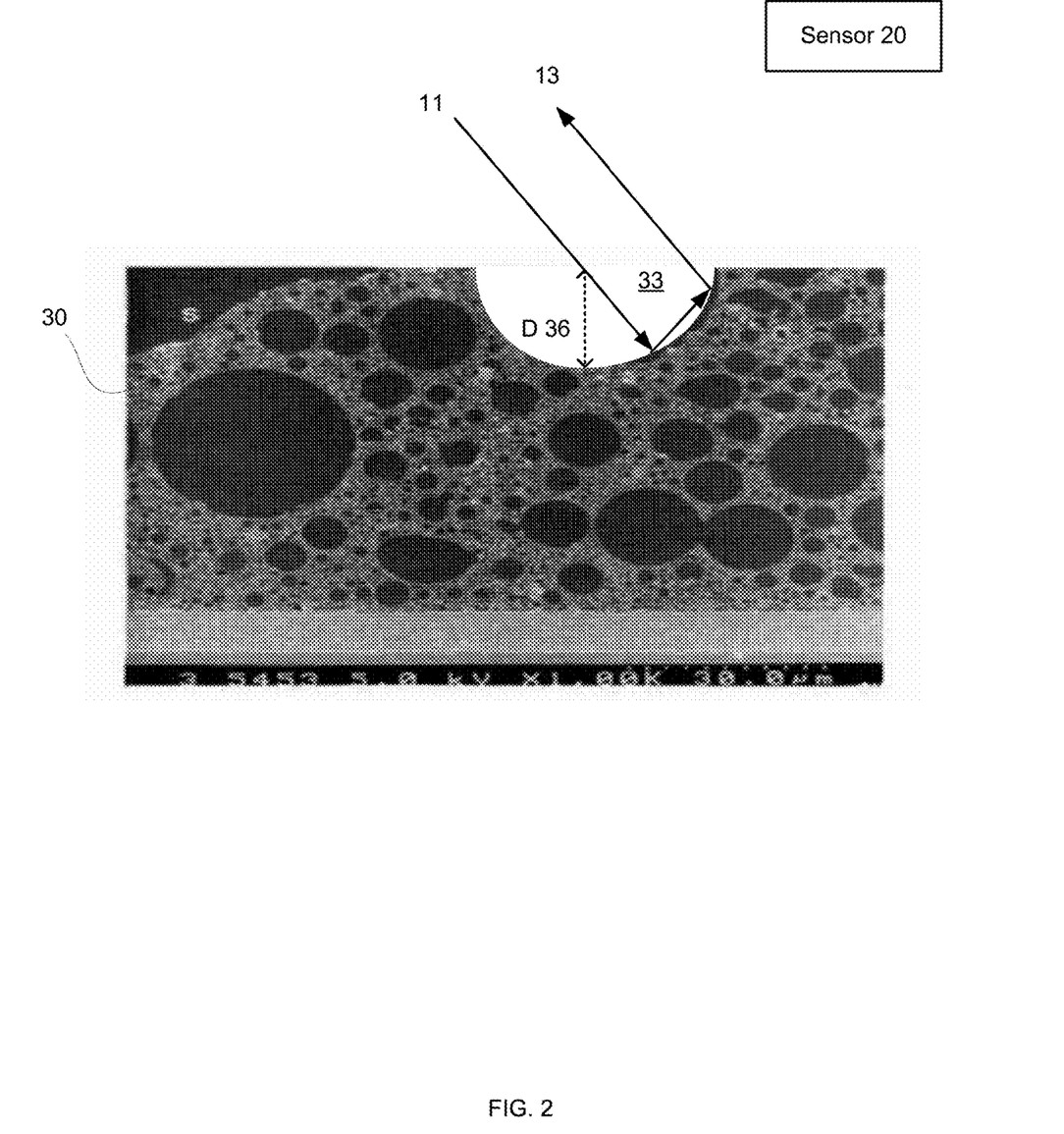
FIG. 2 is an example of a cross section of a part of a chip and illumination and reflected radiation beams.

FIG. 2 is an example of a cross section of a part 30 of a chip, illumination beam 11 that impinges on a hollow filler (pit defect) 33, and is reflected to provide a diffused beam 13 that is not directed towards sensor 20. The hollow filler 33 has a depth 36.

Figure 3:
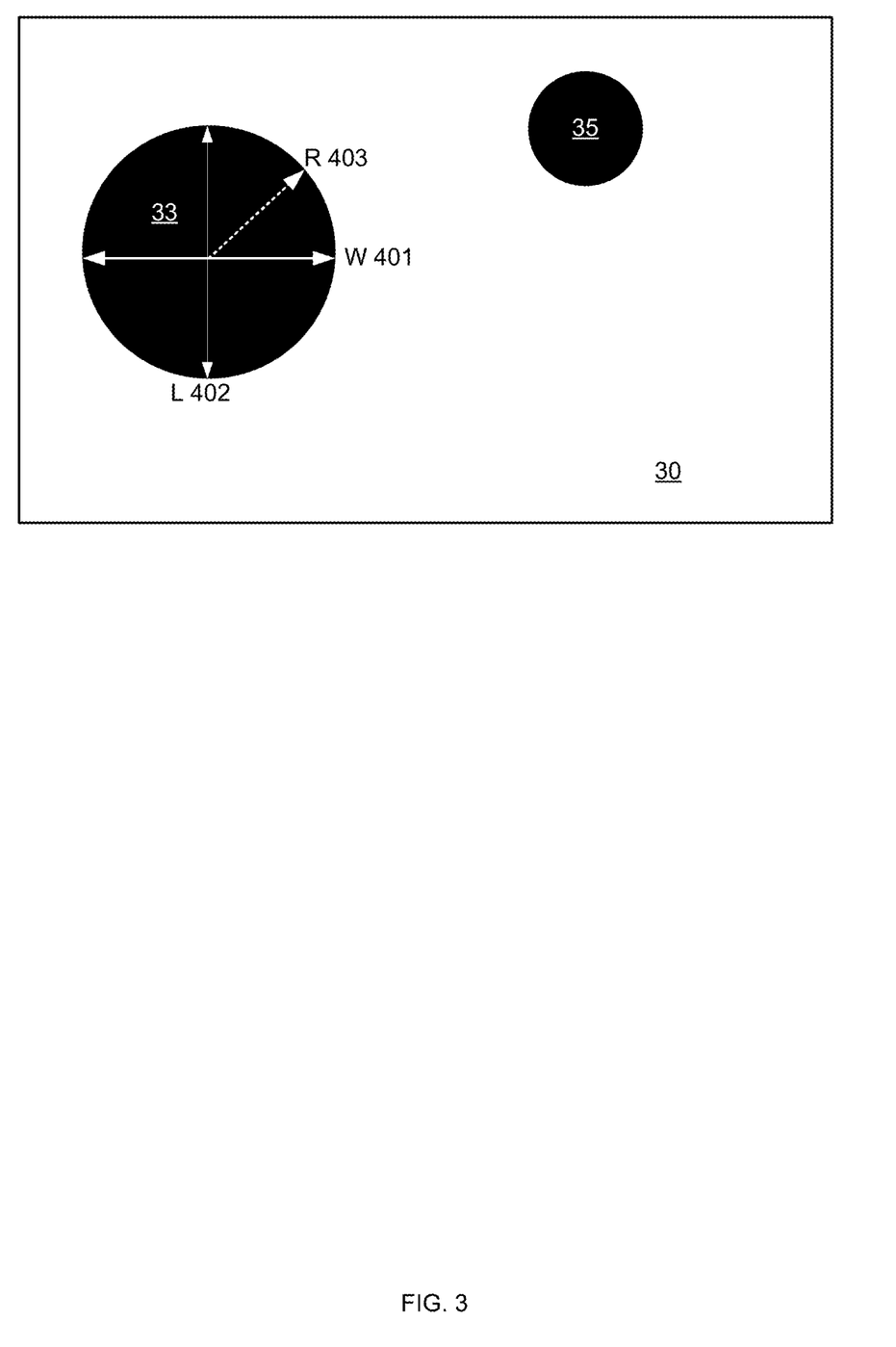
FIG. 3 is a two-dimensional image of a part of a chip.

FIG. 3 is a two-dimensional image of a part of a chip 30. The hollow filler 33 is dark and has a width W 401, length L 402 and radius R 403. The image also illustrates a dark region 35 that is too small to be regarded as a hollow filler.

Although various figures illustrate the hollow filler as a perfect half of a sphere—the hollow filler may deviate from this perfect shape.

Figure 4:
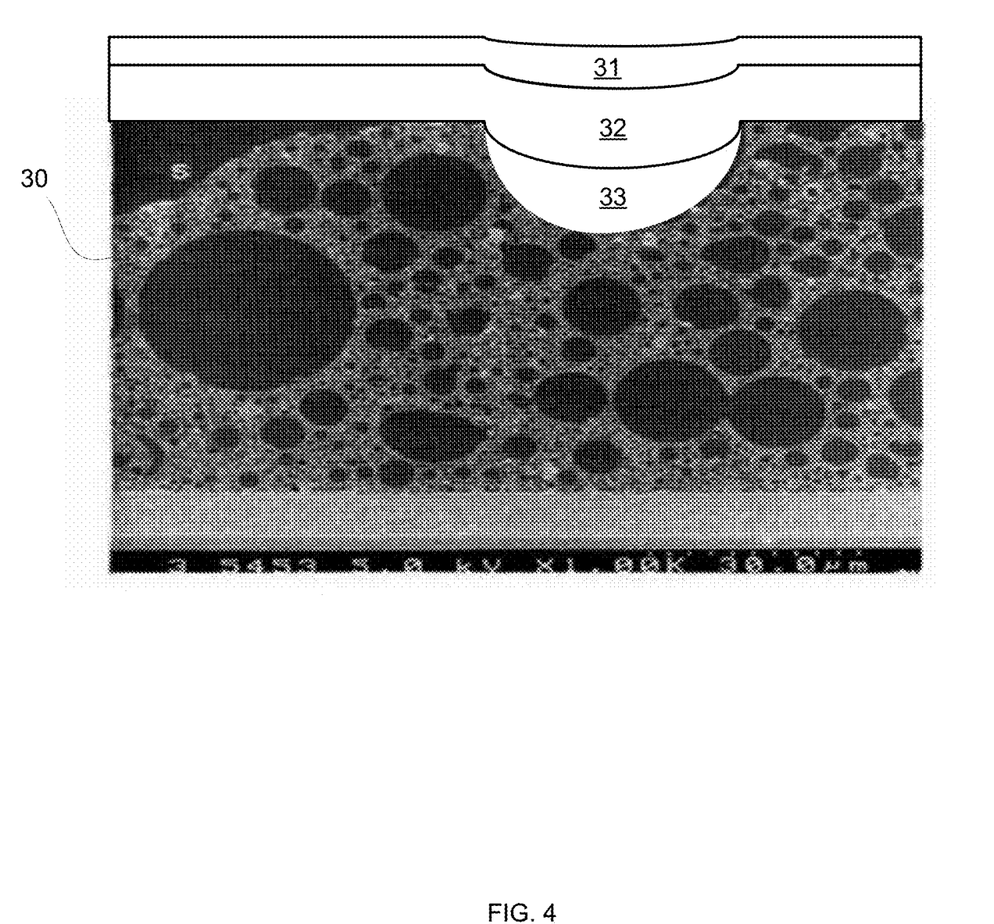
FIG. 4 is an example of a part of a chip that illustrated a pit defect that introduces a deformation in a sacrificial layer and in an redistribution layer.

FIG. 4 is an example of a part of a chip that illustrated a pit defect 33 that introduces a deformation in a sacrificial layer 31 and a deformation in a redistribution layer 32—as both will become non-flat and concave—thereby causing an RDL line defect.

There may be provided systems, methods and computer program products for detecting pits in InFO packages—especially pits defects with depths in excess of curtain number for example 8 um.

Figure 5:
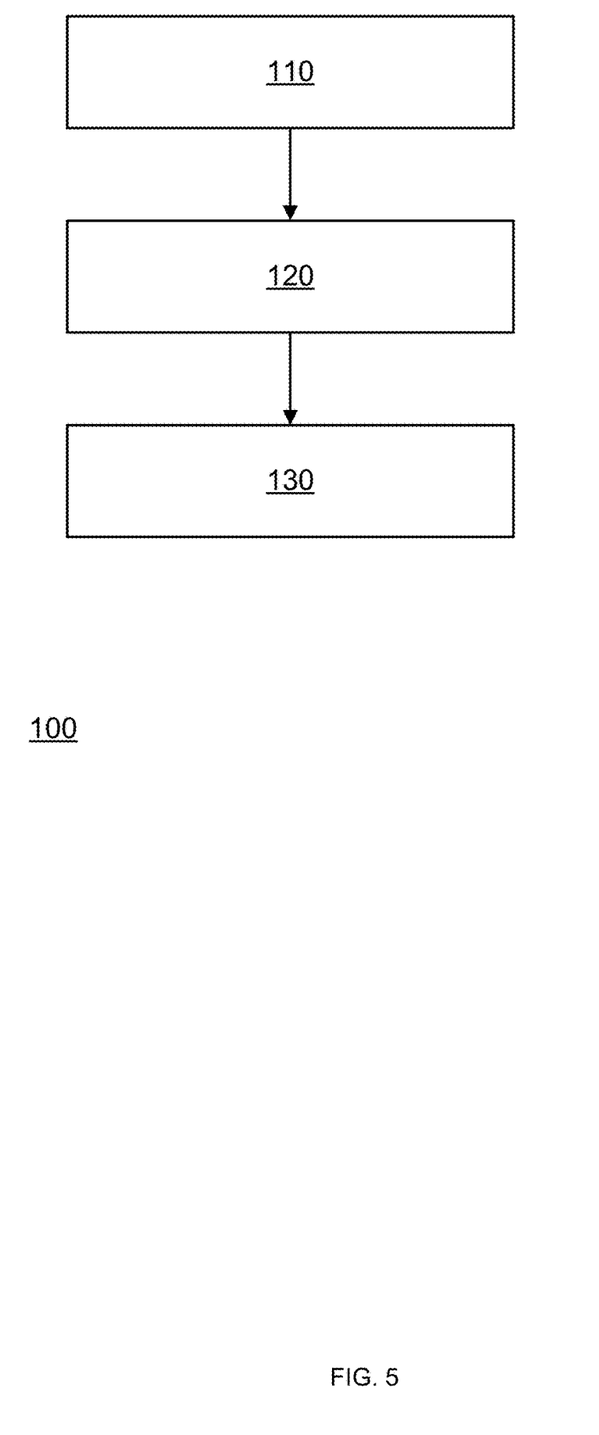
FIG. 5 is an example of a method.

FIG. 5 illustrate a method 100 for detecting defects in a thinned die.

Method may include steps 110,

Step 110 includes inspecting the thinned die with a two-dimensional inspection module, to find suspected defects that appear as non-reflecting regions that fulfill a size condition.

The size condition may be fulfilled when (a) a length of the non-reflecting region substantially equals a width of the non-reflecting regions; and (b) the length of the non-reflecting region and the width of the non-reflecting regions exceed a size threshold.

Alternatively, the size condition may be fulfilled when a radius of the non-reflecting region exceeds a size threshold.

Step 110 may be followed by step 120 of measuring, using a depth measurement module, a depth of the suspected defects.

The depth measurement process may be a time consuming process and thus step 120 may include measuring the depth only of suspected defects, not measuring depths of non-reflecting regions that do not fulfill the size condition, and the like.

Step 120 may be followed by step 130 of defining a suspected defect as a defect when the depth parameter of the suspected defect exceeds a depth threshold.

Each one of the size threshold, and depth threshold may be of at least microscopic scale—for example each one of the thresholds may be not smaller than 5 microns, may be not smaller than 8 microns, and the like.

The method may be applicable for different applications, not only Fan Out wafers.

Figure 6:
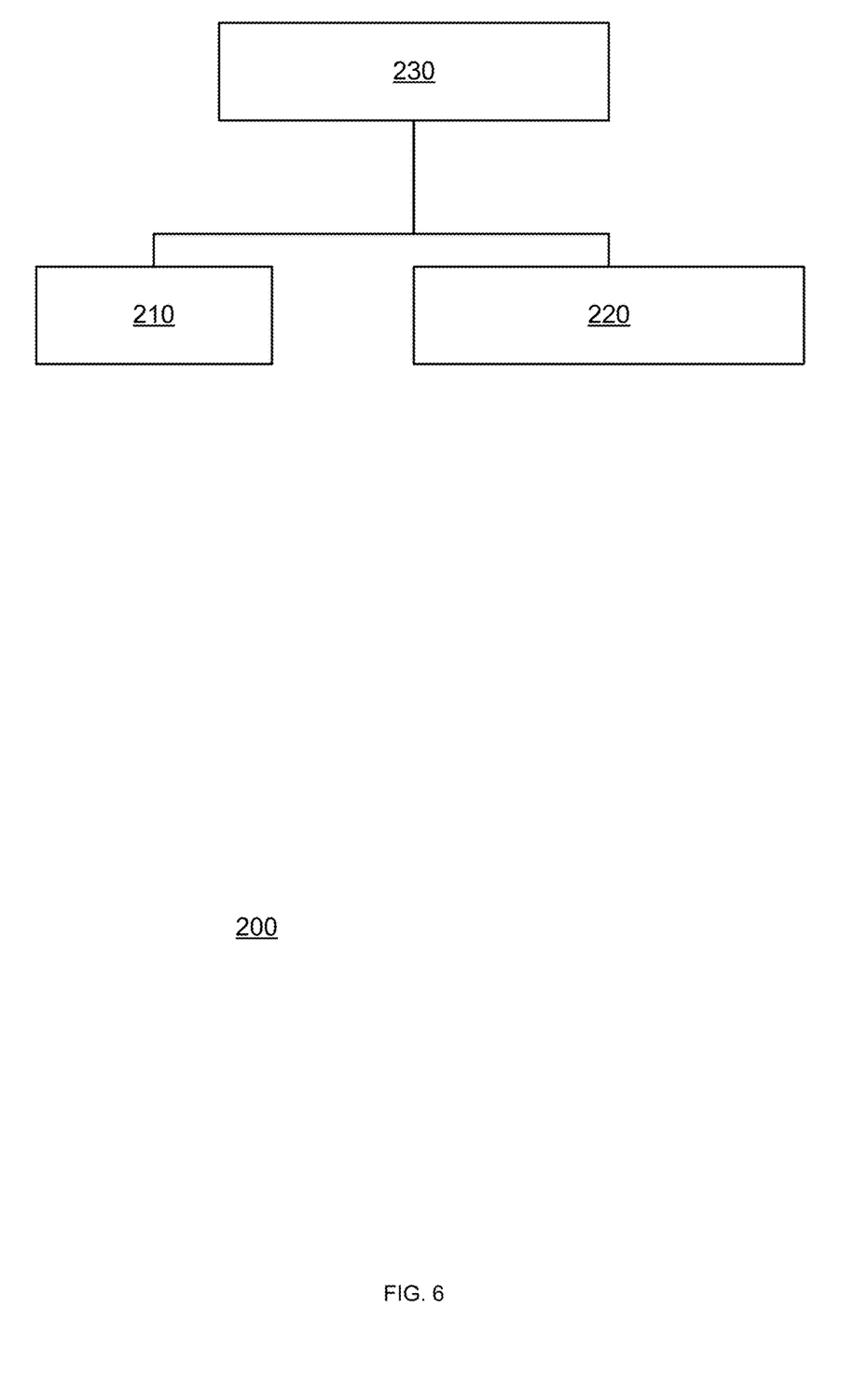
FIG. 6 is an example of a system.

Referring to FIG. 6—there may be provided an AOI system 200 that:

a. Allocates suspected pits by a two-dimensional inspection module (210), the two-dimensional inspection module may be configured to detect suspected pits defects as dark (non-reflecting) regions or areas that are round and have a radius that exceeds a radius threshold (or otherwise within a predefined range). Alternatively, instead of checking that the dark regions are circular—the two-dimensional inspection module may be configured to detect suspected pits defects as dark (non-reflecting) regions or areas that have a length and a width that fulfill a size condition.

b. A depth measurement module such as a three-dimensional inspection module (220) may be configured to measure a depth of the suspected pit defect, and if it excess of curtain number (for example 5 microns, or 8 microns)—or may be otherwise within a predefined region, then the defect may be recognized.

The system may also include a processor 230 for determining whether suspected defect is a defect based on the the measurements of the inspection modules mentioned above.

The processor 230 may be included in either one of the three-dimensional inspection module and the two-dimensional inspection module.

The two-dimensional inspection module may be configured to acquire two-dimensional images—and it may include one or more two-dimensional image sensors.

The two-dimensional inspection module may be capable of acquiring two-dimensional information such as two-dimensional images. A two-dimensional inspection module may include one or more illumination units, one or more two-dimensional detectors, optics, mechanical elements (such as a stage) for introducing movement between the inspected object and the one or more illumination units and/or the one or more two-dimensional detectors, an image processor and a controller.

The three-dimensional module may be configured to acquire three-dimensional images (or a receive or obtain by itself two-dimensional images that may be processed to provide three-dimensional information).

A three-dimensional inspection module may include one or more illumination units, one or more three-dimensional detectors, optics, mechanical elements (such as a stage) for introducing movement between the inspected object and the one or more illumination units and/or the one or more three-dimensional detectors, an image processor and a controller.

The Eagle family of Camtek™ is an example of an inspection systems that may apply method 100. Eagle AP™ and Eagle AP-T™ have both two-dimensional inspection modules and some members have both two-dimensional inspection modules and three-dimensional inspection modules. Eagle i™ and Eagle T-i™ have two-dimensional inspection modules.

One or more three-dimensional sensors may be used such as laser triangulation modules, interferometers (white light or monochromatic interferometers), confocal chromatic sensors, or other confocal sensors, etc.

Different two-dimensional sensors may be used—such as bright field (BF) sensors, dark field (DF) sensors, time delay and integration (TDI) sensors, CMOS sensors, line cameras, array cameras, and the like.

The suggested system, method and computer program product provides a fast and reliable detection process of pits defects.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The application is not limited to two-dimensional and may expand to three-dimensional inspection. The inspected substrate is not limited to a wafer and may include any type of substrate, especially flat substrates such as a printer circuit board, a solar panel, a MEMS device and the like.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for detecting defects in a thinned die, the method comprising:
    inspecting the thinned die with a two-dimensional inspection module, to find suspected defects that appear as non-reflecting regions that fulfill a size condition;
    measuring, using a depth measurement module, a depth of the suspected defects; and
    defining a suspected defects as a defects when the depth parameter exceeds a depth threshold.

2. The method according to claim 1, wherein the depth threshold is not smaller than 5 microns.

3. The method according to claim 1, wherein the size condition is fulfilled when a radius of the non-reflecting region exceeds a radius threshold.

4. The method according to claim 3, wherein the radius threshold is not smaller than eight microns.

5. The method according to claim 3, wherein the radius threshold is not smaller than five microns.

6. The method according to claim 1, wherein the size condition is fulfilled when (a) a length of the non-reflecting region substantially equals a width of the non-reflecting regions; and (b) the length of the non-reflecting region and the width of the non-reflecting regions exceed a size threshold.

7. The method according to claim 6, wherein the size threshold is not smaller than eight microns.

8. The method according to claim 6, wherein the size threshold is not smaller than five microns.

9. A system comprising a two-dimensional inspection module and a depth measurement module; wherein the two-dimensional inspection module is configured to inspect a thinned die to find suspected defects that appear as non-reflecting regions that fulfill a size condition; wherein the depth measurement module is configured to measure a depth of the suspected defects; and a processor that is configured to define suspected defects as a defects when the depth parameter exceeds a depth threshold.

10. The system according to claim 9, wherein the size condition is fulfilled when (a) a length of the non-reflecting region substantially equals a width of the non-reflecting regions; and (b) the length of the non-reflecting region and the width of the non-reflecting regions exceed a size threshold.

11. A non-transitory computer readable medium that stores instructions that once executed by a system causes the system to: inspect the thinned die with a two-dimensional inspection module of the system, to find suspected defects that appear as non-reflecting regions that fulfill a size condition; measuring, using a depth measurement module of the system, a depth of the suspected defects; and defining a suspected defects as a defects when the depth parameter exceeds a depth threshold.

12. The non-transitory computer readable medium according to claim 11, wherein the depth threshold is not smaller than 5 microns.

13. The non-transitory computer readable medium according to claim 11, wherein the size condition is fulfilled when a radius of the non-reflecting region exceeds a radius threshold.

14. The non-transitory computer readable medium according to claim 13, wherein the radius threshold is not smaller than eight microns.

15. The non-transitory computer readable medium according to claim 13, wherein the radius threshold is not smaller than five microns.

16. The non-transitory computer readable medium according to claim 11, wherein the size condition is fulfilled when (a) a length of the non-reflecting region substantially equals a width of the non-reflecting regions; and (b) the length of the non-reflecting region and the width of the non-reflecting regions exceed a size threshold.

17. The non-transitory computer readable medium according to claim f, wherein the size threshold is not smaller than eight microns.

18. The non-transitory computer readable medium according to claim f, wherein the size threshold is not smaller than five microns.

19. The method according to claim 1 comprising preventing from measuring depths of non-reflecting regions that do not fulfill the size condition.

20. The method according to claim 1 wherein the size condition differs from a depth of the non-reflecting regions.

21. The non-transitory computer readable medium according to claim 11 that stores instructions for preventing from measuring depths of non-reflecting regions that do not fulfill the size condition.

22. The system according to claim 9 wherein the depth measurement module is configured not to measure depths of non-reflecting regions that do not fulfill the size condition.

* * * * *